United States Patent [19]

Markezich

[11] Patent Number: 4,707,506

[45] Date of Patent: * Nov. 17, 1987

[54] POLYESTERETHER ELASTOMER COMPOSITIONS HAVING IMPROVED FLAME RETARDANT PROPERTIES

[75] Inventor: Ronald L. Markezich, Williamsville, N.Y.

[73] Assignee: Occidental Chemical Corporation, Niagara Falls, N.Y.

[*] Notice: The portion of the term of this patent subsequent to Sep. 23, 2003 has been disclaimed.

[21] Appl. No.: 807,892

[22] Filed: Dec. 11, 1985

Related U.S. Application Data

[63] Continuation-in-part of Ser. No. 740,600, Jun. 3, 1985, Pat. No. 4,613,651.

[51] Int. Cl.$^4$ .................................................. C08L 67/02
[52] U.S. Cl. .................................. 524/89; 524/411; 525/173
[58] Field of Search ................... 525/173; 524/89, 411

[56] References Cited

U.S. PATENT DOCUMENTS

| | | | |
|---|---|---|---|
| 3,671,487 | 6/1972 | Abolins | 525/165 |
| 3,748,340 | 7/1973 | Hayes | 524/89 |
| 4,191,678 | 3/1980 | Smith | 524/371 |
| 4,315,882 | 2/1982 | Hiratsuka | 264/171 |
| 4,374,220 | 2/1983 | Sonnemberg | 524/94 |

Primary Examiner—Patricia A. Short
Attorney, Agent, or Firm—James F. Tao; Arthur S. Cookfair

[57] ABSTRACT

Flame retardant polyesterether elastomer compositions having superior high temperature processability and heat aging properties, resistance to blooming, improved flame retardance, and reduced smoke generation and reduced dripping during burning, comprise (a) a copolyesterether elastomer prepared from dimethyl terephthalate, polyether glycol and 1,4-butanediol;

(b) a chlorinated bisimide of the formula:

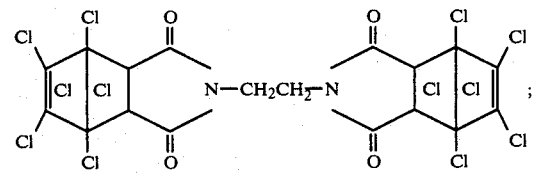

(c) antimony trioxide; and
(d) polytetrafluoroethylene.

7 Claims, No Drawings

POLYESTERETHER ELASTOMER COMPOSITIONS HAVING IMPROVED FLAME RETARDANT PROPERTIES

This is a continuation-in-part of application Ser. No. 740,600, filed June 3, 1985, U.S. Pat. No. 4,613,651.

BACKGROUND OF THE INVENTION

This invention relates to flame retardant polyesterether compositions which have significantly reduced blooming of the flame retardant after molding, high temperature processability, reduced smoke generation, superior heat aging, and in addition, improved non-drip characteristics under combustion conditions.

Thermoplastic polyesterethers have become increasingly important in recent years due to their excellent processability and superior mechanical, chemical and electrical properties. A representative thermoplastic polyesterether is Hytrel ®, which is manufactured and sold by the DuPont Company. This material is a co-polyester which is prepared by the reaction of dimethyl terephthalate, polyether glycol, and excess 1,4-butanediol. Hytrel ® is an elastomer which has superior tensile and flexural strength, abrasion resistance, and good electrical properties.

Many commercial uses for thermoplastic polyesterethers require a level of flame retardancy not present in the base resin. Such compositions are desired for applications such as in-home construction, automobile and air craft manufacture, packaging, electrical equipment, and the like. To meet this demand, a wide variety of halogenated compounds have been used in these compositions to impart flame retardancy. Unfortunately, however, the addition of flame retardants to the resin has been at the expense of other physical properties which render the resin desirable, such as superior toughness and strength. Specifically, the use of conventional flame retardant additives can cause decreased flexural strength and heat distortion resistance, particularly in glass filled compositions. Accordingly, a flame retardant additive must be carefully selected not only on the basis of its principal function, i.e., flame retardancy, but also with regard to its effect on the other physical properties of the polymer composition.

The high processing temperatures required for molding thermoplastic polyester and polyesterether compositions also place constraints on the flame retardant additive which can be employed. Such processing temperatures are required to reduce cycle times, but often preclude the use of thermally unstable additives. Thermal instability can result in a deterioration in surface appearance as evidenced by an unsatisfactory color change in the molded article.

It is also highly desirable to further improve upon other physical properties of the composition such as smoke generation and heat aging.

Chlorinated bisimides such as those of the present invention have been disclosed as effective flame retardant additives for various polymers such as ABS and polyolefins. See, for instance, the disclosures in U.S. Pat. No. 4,374,220, issued Apr. 15, 1975, U.S. Pat. No. 3,734,758, issued May 22, 1973, and British Published Application No. 1,287,934, published Sept. 6, 1972. However, none of these references discloses the use of the chlorinated bisimides of the present invention as flame retardants in thermoplastic polyesterethers. Moreover, none of these references suggest that the incorporation of such chlorinated bisimides in these resins would also reduce or eliminate blooming, reduce thermal degradation under high temperature processing conditions significantly reduce smoke generation, and provide better heat aging.

It is therefore a principal object of the present invention to provide superior non-blooming, flame retardant thermplastic polyesterether compositions which possess excellent processability and physical properties. In addition, it is frequently desirable to further modify the nature of thermoplastic polyesterether compositions to render these polymers non-dripping during combustion and thus minimize the spread of damage or propagation of fire as a result of the spread of heated and/or flaming droplets. Accordingly, it is a further object of this invention to provide flame retardant, non-dripping thermoplastic polyesterether compositions.

SUMMARY OF THE INVENTION

It has now been found that flame retardant thermoplastic polyesterether compositions having excellent high temperature processability, resistance to blooming, superior heat aging properties, reduced smoke generation and under reduced dripping under combustion conditions comprise (a) about 40 to about 85 percent of a polyesterether elastomer prepared from dimethyl terephthalate, polyether glycol and 1,4-butanediol;

(b) about 5 to about 55 percent of a chlorinated bisimide of the formula

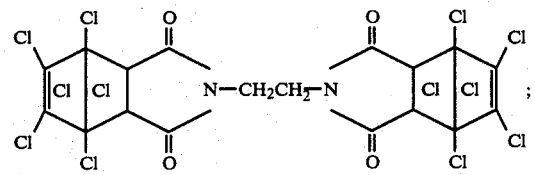

(c) about 1.0 to about 40 percent antimony trioxide; and (d) about 0.05 to about 5.0 percent of polytetrafluoroethylene.

DESCRIPTION OF THE PREFERRED EMBODIMENTS

Suitable thermoplastic polyesterethers are prepared, for example, by the catalyzed melt transesterification reaction of a mixture of dimethyl terephthalate, polyether glycol, and excess 1,4-butanediol. Representative of such polyesterethers is Hytrel ®, which is manufactured and sold by the duPont Company. Hytrel ® polymers are elastomeric block copolymers having repeating units of tetramethylene terephthalate and poly(alkylene ether terephthalate) Thermoplastic polyesterethers are generally recognized to have superior tensile and tear strength, flex life, abrasion resistance, and good electrical properties. See Kirk-Othmer, *Encyclopedia of Chemical Technology*, 3rd Edition, Volume 8, pp. 636–638 (1982). Detailed descriptions of suitable polyesterether, that can be employed in the compositions of this invention, and procedures for their preparation are set forth in U.S. Pat. Nos. 3,023,192; 3,651,014; 3,763,109; and 3,766,146.

The flame retardant additive of this invention is a chlorinated bisimide characterized by the formula:

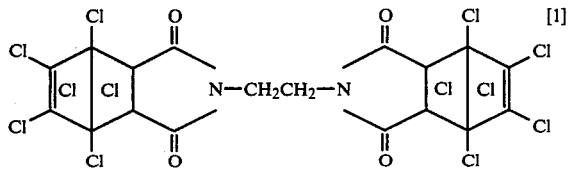

The chlorinated bisimide can be prepared by the reaction of chlorendic anhydride and ethylene diamine. See U.S. Pat. No. 4,374,220, issued Feb. 15, 1983 to Sonnenberg, the pertinent portions of which are incorporated herein by reference. The preparation of this compound is more fully described in Example 1 below. In accordance with accepted international chemical nomenclature, this compound is designated as 2,2-(1,2-ethanediyl)bis[4,5,6,7,8,8-hexachloro-3a,4,7,7a-*tetrahydro-(9Cl)*]-4,7-methano-1H-isoindol-1,3(2H)-dione.

Polytetrafluoroethylene resins employed in accordance with this invention are commercially available or may be prepared by known processes. The resins are white solids obtained by polymerization of tetrafluoroethylene, typically in aqueous media with a free radical catalyst such as sodium, potassium, or ammonium peroxydisulfates at 100 to 1000 psi at 0° to 200° C. as described in U.S. Pat. No. 2,393,967. The preferred polytetrafluoroethylene resins are commercially available from E. I. DuPont de Nemours and Company as Teflon®6C. The incorporation of a small amount, for example, about 0.05 to about 5 percent of polytetrafluoroethylene in the molding compositions of this invention has been found surprisingly effective in imparting non-drip properties when the compositions are subjected to flaming conditions.

The thermoplastic compositions of the present invention comprise from about 40 to about 85, preferably from about 50 to about 75 percent by weight of polyesterether from about 5 to about 55, preferably from about 15 to about 35 percent, by weight of chlorinated bisimide and about 0.05 to about 5.0, preferably about 0.05 to about 2.0 percent by weight polytetrafluoroethylene. Antimony trioxide is also present in the molding composition as a synergistic flame retardant additive in an amount of from about 1.0 to about 40 and preferably from about 5.0 to about 25.0 percent by weight. The molding composition based on a polyesterether resin is an elastomer and does not normally include glass fiber.

The components of the molding compositions as described above can be compounded to form an intimate mixture suitable for molding by various techniques known in the art. The components may be ground or pulverized, and the powder mixed in a conventional fashion to form a blend suitable for molding. Alternatively, the fire retardant components may be added and mixed with a molten polymer blend. The blend may then be molded, extruded, or otherwise formed into useful articles or shapes.

The molding compounds are particularly adaptable for injection molding techniques. Furthermore, various other additives may be incorporated into the blend such as plasticizers, lubricants, fillers, dyes, pigments, mold-release agents, anti-static agents, and the like.

The molding compositions of the present invention offer the particular advantage of being resistant to blooming after being formed into a molded article. Resistance to blooming is an indication that the flame retardant is retained within the molded article and not exuded from the surface. Good resistance to blooming is essential for molded articles which must meet stringent UL requirements for self-extinguishing compositions, and such articles are most frequently found in electrical applications. This resistance to blooming is surprising in view of the ease with which blooming occurs in compositions using related flame retardants such as decabromodiphenyl ether, decabromodiphenyl oxide, and Dechlorane Plus.

The following examples are provided to further illustrate this invention and the manner in which it may be carried out. It will be understood, however, that the specific details given in the examples have been chosen for purposes of illustration only and are not to be construed as limiting the invention. In the examples, unless otherwise indicated, all parts and percentages are by weight and all temperatures are in degrees Celsius.

EXAMPLE 1

Following the procedure of U.S. Pat. No. 4,374,220, 0.22 moles of chlorendic anhydride, 0.11 moles of ethylene diamine and 500 ml of xylene were added to a 1 liter flask equipped with a nitrogen purge, a heating mantle, a mechanical stirrer, a reflux condenser and a Dean-Stark apparatus. The mixture was refluxed for ½ hour during which time 3.2 mls. of water was collected. The reaction mixture was cooled and filtered to give 68% yield of the chlorinated bisimide (formula I) as white crystals having a melting point of 354°–356° C.

EXAMPLE 2

One hundred parts of polyesterether (HytreL ®4056) was softened and milled on a two-roll mill operated at 150° C. Milling was continued while 40 parts of chlorinated bisimide [1] prepared in Example 1, and 20 parts of antimony trioxide was added to the softened elastomer. The milled material was then ground and molded into test bars by injection molding at 180° C.

EXAMPLE 3

The procedure of Example 2 was repeated except that in addition to the chlorinated bisimide [1] and antimony trioxide, 5.0 parts of fumed colloidal silica (Cabosil ®-17; available from Cabot Corporation, Boston, Mass.) was added to the softened elastomer during milling.

EXAMPLE 4

The procedure of Example 2 was repeated except that in addition to the chlorinated bisimide and antimony trioxide, 0.5 parts of tetrafluoroethylene was added to the softened elastomer. during milling.

The test bars prepared in accordance with Examples 2, 3 and 4 were tested, in accordance with Underwriters Laboratory Test Method 94, for flame retardancy and drip characteristics with the results as set forth in Table 1 below.

EXAMPLE 5

One hundred parts of polyesterether (Hytrel ®4074), 35 parts of chlorinated bisimide [1], 17.5 parts of antimony trioxide, and 0.1 parts of tetrafluoroethylene (Teflon ®6C), were mixed and extruded at 200° C. into pellets. The pellets were injection molded at 187° C. into test bars. The test bars were tested for flame retardancy and drip characteristics in accordance with Underwriters Laboratory Test Method 94 with the results as set forth in Table 1 below.

EXAMPLES 6-16

The procedure of Example 5 was repeated except that the composition was varied as shown in Table 1 below. The test bars were tested in accordance with Underwriters Laboratory Test Method 94, for fire retardancy and drip characteristics with the results as shown in the Table.

TABLE 1

| Composition (Parts By Weight) | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|
| Hytrel ® 4056 | 100 | 100 | 100 | | | | | | | 100 | 100 | 100 | 100 | 100 | 100 | 100 |
| Hytrel ® 4074 | | | | 100 | 100 | 100 | 100 | 100 | 100 | | | | | | | |
| Chlorinated Bisimide* | 40 | 40 | 40 | 35 | 35 | 35 | 35 | 35 | 35 | 40 | 40 | 35 | 35 | 40 | 40 | 40 |
| $Sb_2O_3$ | 20 | 20 | 20 | 17.5 | 17.5 | 15 | 12 | 17.5 | 17.5 | 20 | 20 | 17.5 | 20 | 20 | 20 | 20 |
| Polytetrafluoroethylene** | — | — | 0.5 | 0.1 | 0.05 | 0.1 | 0.1 | — | 0.1 | 0.1 | 0.05 | 0.1 | 0.1 | 0.5 | 0.3 | 0.1 |
| Colloidal Silica | | 5.0 | | | | | | | | | | | | | | |
| Properties | | | | | | | | | | | | | | | | |
| UL-94 | | | | | | | | | | | | | | | | |
| ⅛ inch | V-0 | V-0 | V-0 | V-0 | V-0 | V-0 | V-1 | V-0 | V-0 | V-0 | V-0 | V-0 | V-0 | V-0 | V-0 | V-0 |
| 1/16 inch | V-2 | V-2 | V-0 | V-0 | V-0 | V-0 | V-2 | V-0 | V-0 | V-0 | V-0 | V-0 | V-0 | V-0 | V-0 | V-0 |
| Drip Test 1/16 inch (Number of test bars that exhibited drip in each 5 bar test group) | 5 | 5 | 0 | 0 | 5 | 1 | 4 | 5 | 0 | 0 | 1 | 0 | 0 | 0 | 0 | 0 |

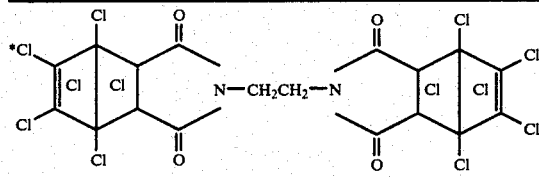

*

**Teflon ® 6C; I. E. DuPont de Nemours and Company.

What is claimed is:

1. A flame retardant thermoplastic polyesterether composition comprising
   (a) from about 40 to about 85 percent by weight of a polyesterether elastomer prepared from dimethyl terephthalate, polyether glycol and 1,4-butanediol;
   (b) from about 1.0 to about 40 percent by weight of antimony trioxide;
   (c) at least about 5 percent by weight of a chlorinated bisimide of the formula

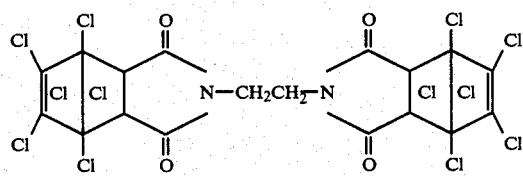

(d) about 0.05 to about 5.0 percent polytetrafluoroethylene.

2. A composition according to claim 1, wherein the polyesterether elastomer is present in an amount of about 50 to about 75 percent by weight.

3. A composition according to claim 1, wherein the chlorinated bisimide is present in an amount of about 15 to about 35 percent by weight.

4. A molded article prepared from the composition of claim 1.

5. A flame retardant thermoplastic polyesterether composition according to claim 1, comprising
   (a) from about 50 to about 75 percent by weight of a polyesterether elastomer prepared from dimethyl terephthalate, polyether glycol and 1,4-butanediol;
   (b) from about 5.0 to about 25 percent by weight of antimony trioxide;
   (c) from about 15 to about 35 percent by weight of a chlorinated bisimide of the formula

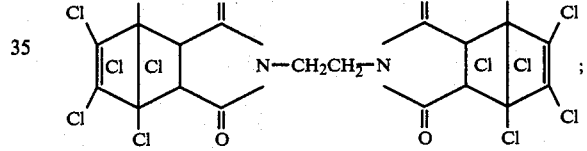

and
   (d) about 0.05 to about 2.0 percent polytetrafluoroethylene.

6. A molded article prepared from the composition of claim 5.

7. A flame retardant thermoplastic polyesterether composition comprising
   (a) about 50 to about 75 percent by weight of a polyesterether block copolymer having repeating units of tetramethylene terephthalate and poly-(alkylene ether terephthalate)
   (b) from about 5.0 to about 25 percent by weight of antimony trioxide;
   (c) from about 15 to about 35 percent by weight of a chlorinated bisimide of the formula

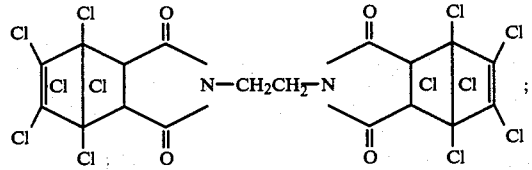

and
   (d) about 0.05 to about 2.0 percent polytetrafluoroethylene.

* * * * *